Figures 1, 3:
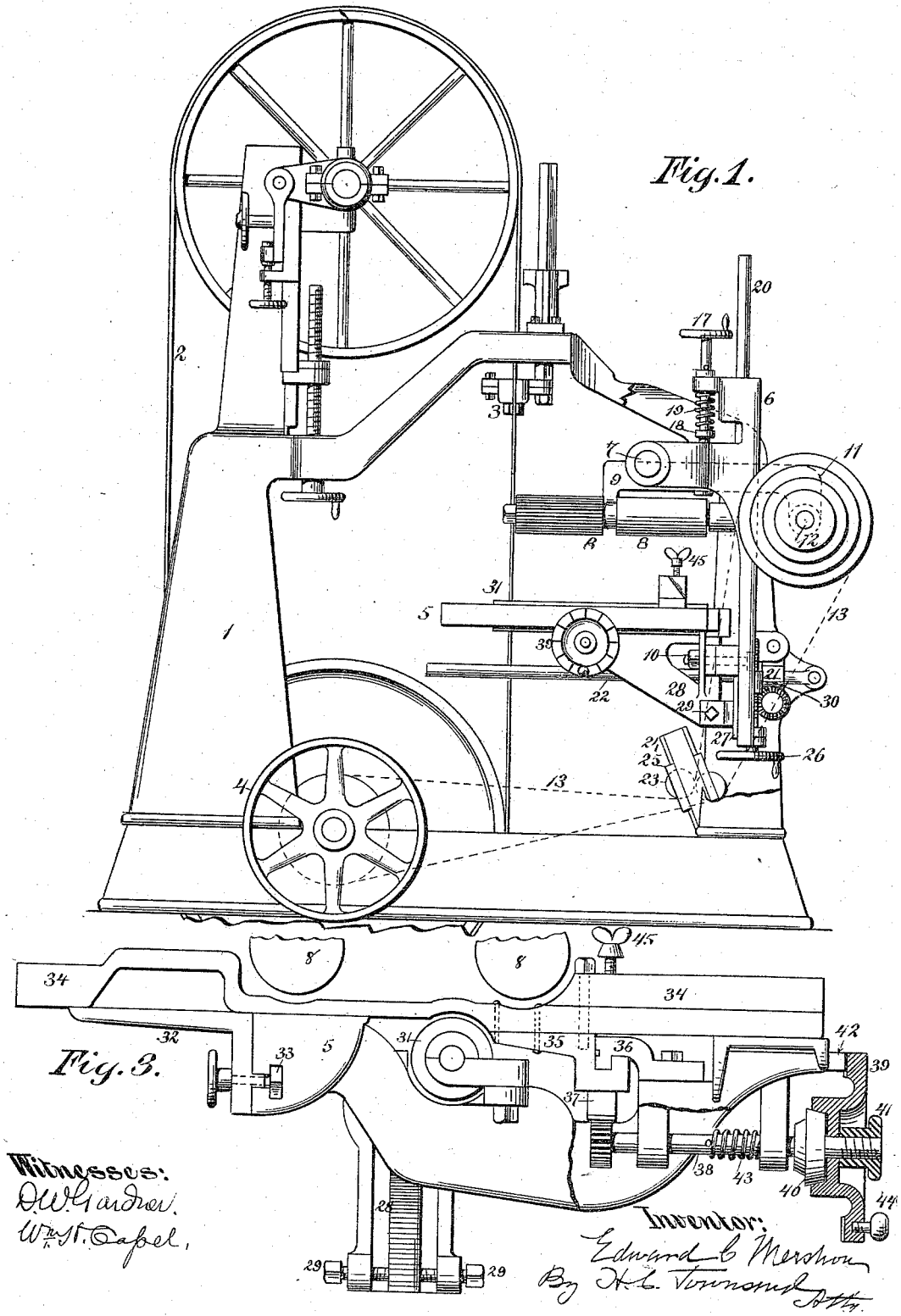

(No Model.)  3 Sheets—Sheet 1.

E. C. MERSHON.
COMBINED BAND RIPSAW AND RESAW.

No. 526,160.  Patented Sept. 18, 1894.

Witnesses:
D. W. Gardner
Wm. T. Capel

Inventor:
Edward C. Mershon
By H. L. Townsend
Atty.

THE NORRIS PETERS CO., PHOTO-LITHO., WASHINGTON, D. C.

(No Model.) 3 Sheets—Sheet 2.

E. C. MERSHON.
COMBINED BAND RIPSAW AND RESAW.

No. 526,160. Patented Sept. 18, 1894.

(No Model.) 3 Sheets—Sheet 3.
E. C. MERSHON.
COMBINED BAND RIPSAW AND RESAW.
No. 526,160. Patented Sept. 18, 1894.
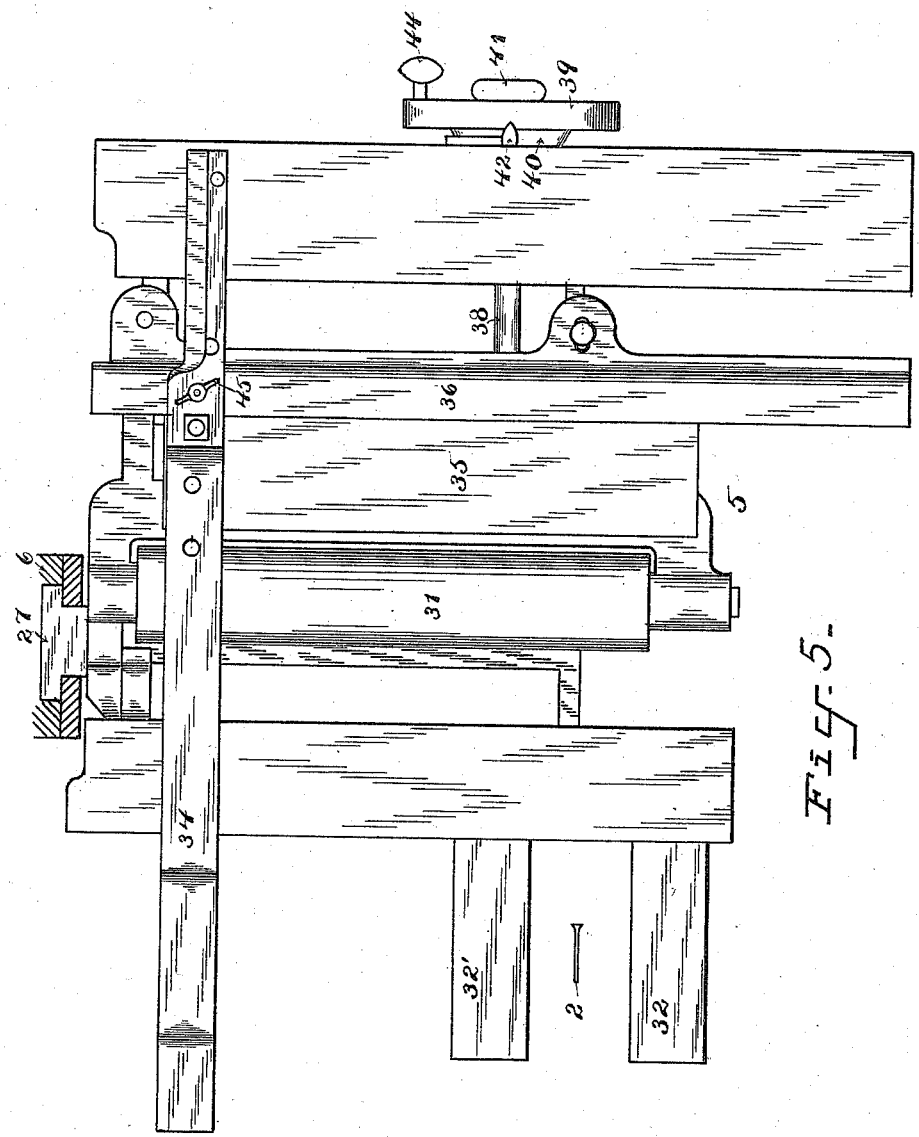
ATTEST:
T. F. Conrey
Wm. N. Capel
INVENTOR:
Edward C. Mershon.
By H. C. Townsend
Attorney.

UNITED STATES PATENT OFFICE.

EDWARD C. MERSHON, OF SAGINAW, MICHIGAN.

COMBINED BAND RIPSAW AND RESAW.

SPECIFICATION forming part of Letters Patent No. 526,160, dated September 18, 1894.

Application filed March 9, 1894. Serial No. 502,956. (No model.)

*To all whom it may concern:*

Be it known that I, EDWARD C. MERSHON, a citizen of the United States, and a resident of Saginaw, in the county of Saginaw and State of Michigan, have invented a certain new and useful Combined Band Ripsaw and Resaw, of which the following is a specification.

My invention relates to a sawing machine in which a band or belt saw is used for slitting or ripping lumber and it has for its object the construction of such machine in a manner to not only provide for ripping lumber but for resawing lumber. To construct a machine for this purpose it is necessary to provide either for rotating the saw through an angle of ninety degrees or for rotating the table through the same angle as in resawing the lumber takes a position at an angle of ninety degrees from that which it takes in ripping.

Sawing machines have heretofore been constructed with tilting tables to allow for presenting lumber to the saw at various oblique angles but so far as I am aware no sawing machine has been constructed in which the table may be tilted sufficiently to allow the work thereon to assume a vertical position or, in other words, no machine so far as I am aware, has been constructed in which the table is capable of being tilted through an angle of ninety degrees, and then be in position to present the lumber to the saw for resawing. To provide for tilting the table in this manner, it is necessary to so pivot or mount it in the frame of the machine that when shifted from the position for ripping it will take its position at one side of the saw and within the desired proximity thereto for resawing.

My invention consists of a machine so constructed that, without substitution and interchanging of parts, it shall be adaptable to ripping and resawing, and a specially formed guide serving simply as a guide in ripping and as a bed plate or a support for the lumber in resawing.

My invention consists also in a tilting table, a guide thereon and an adjusting means for the guide which may itself be adjusted so as to accurately place the guide with relation to the saw when the table assumes different angles to the saw.

My invention consists further in the construction and combination of parts as hereinafter described and set forth in the claims.

Figure 2:
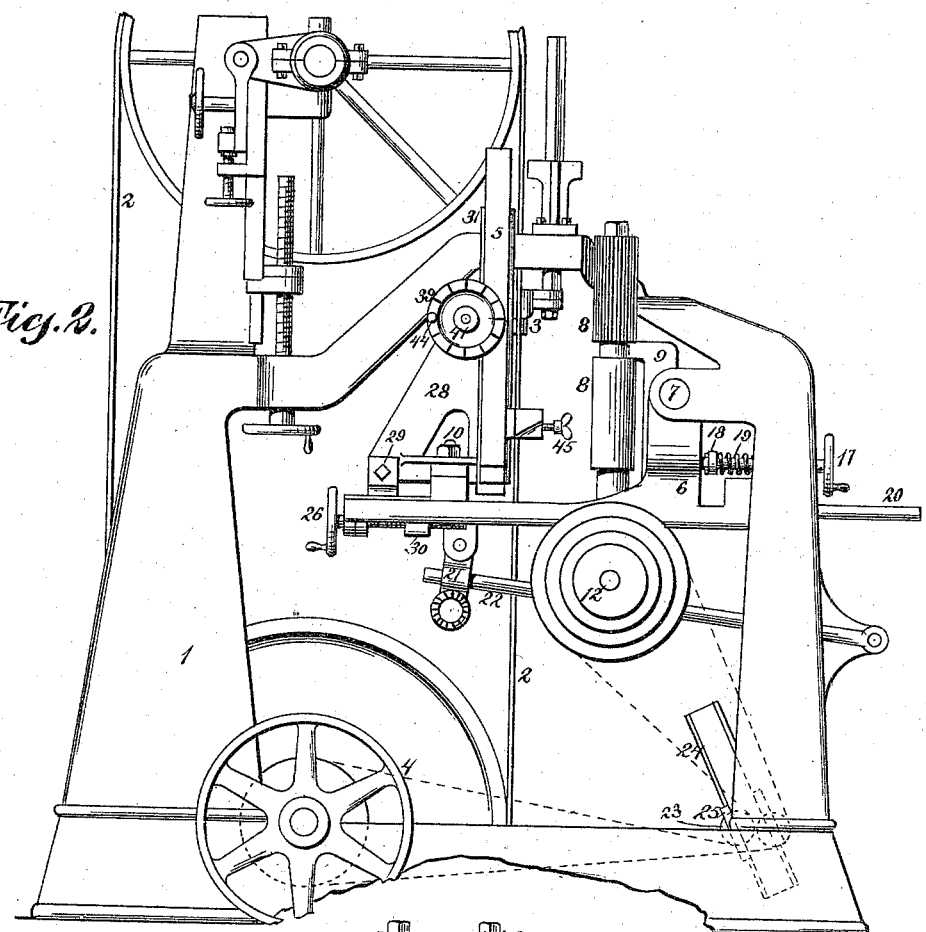
Figure 4:
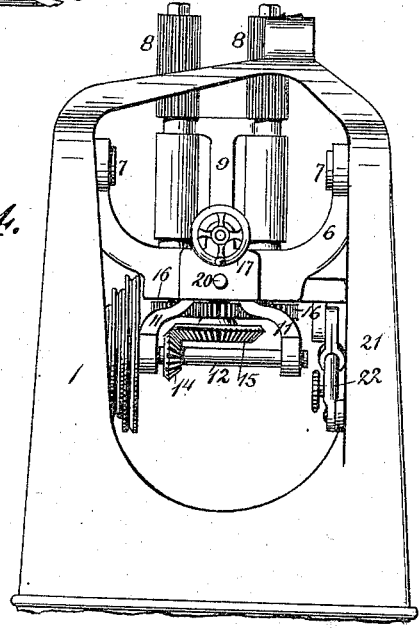

In the accompanying drawings which form a part of this specification and in which the same reference characters represent like parts, Figure 1, is a side elevation of the machine with table in horizontal position adapting the machine for ripping. Fig. 2, is a side elevation with the table placed in a vertical position adapting the machine for resawing. Fig. 3, is an end view of the table on an enlarged scale, the guide operating mechanism being partly in section. Fig. 4, is an end view of Fig. 2, the upper portion of the machine being broken away. Fig. 5, is a plan of the table.

In the drawings 1, represents the frame of the machine. 2, represents the saw mounted in the usual manner upon an upper and lower pulley and provided with the usual guide, as shown at 3, the driving pulley being indicated at 4.

The tilting table 5, may be mounted in any suitable manner that will allow it to be swung through an angle of ninety degrees, but in the preferable form, which I have shown, it is mounted upon a tilting frame 6, provided with trunnions 7, which project over the table and are journaled in bearings upon the frame of the machine at approximately equal distances from the saw and the normal plane of the table.

The feeding rollers 8, are mounted in an adjustable frame 9, constructed to slide in ways formed in the tilting frame. Projecting from said adjustable frame through said ways are arms 11, in which is journaled the shaft 12. On this shaft is a cone pulley which is connected by belt or chain 13, with a pulley on the driving shaft of the machine. On shaft 12, is also mounted a bevel gear which meshes with another bevel gear 15, the latter being journaled on a stud bearing projecting from the adjustable frame 9. On the hub of bevel gear 15, is a spur gear which meshes with the gears 16, upon the feed roller shafts.

Frame 9, is adjusted by means of a hand screw 17, secured in a projection from the tilting frame. Upon the stem of this screw between said projection and the collar 18, is located a spring 19, which provides for the usual self-adjustment of the rollers in running over uneven timber.

Attached to the adjustable frame is a guide rod 20, which passes through a projection on the tilting frame and is extended sufficiently to serve the purpose of a lever in tilting said frame. To secure the table-bearing or tilting frame in any desired position, I provide a clamp 21, which is hinged thereto and which slides on a rod 22, hinged to the frame of the machine.

To provide for keeping the belt 13, taut, as the table is shifted to various positions, I mount a belt tightener 23, upon a suitable guide, as indicated at 24, which is secured to the frame of the machine. This belt tightener consists of a slide 25, bearing the necessary tension rollers. In general the weight of the said tension rollers and slide is sufficient to give the desired amount of tension to the belt. If not a weight of any sort may be readily attached thereto.

The table 5, is mounted to slide vertically in the tilting frame and a screw 26, is provided for raising or lowering the table as desired. For doing this I provide a slide 27, fitted in a guide on the tilting frame to which the table is bolted near its upper surface, by bolt 10, Fig. 1, the bracing web 28, of said table resting between projections from the lower end of said slide. In said projections are seated set screws 29, for adjusting the table to a horizontal position.

The screw 26, for the vertical adjustment of the table resting in a bearing at the lower end of the tilting frame passes through the nut 30, upon the slide 27. In the frame work of the table is mounted the lower feed roller 31.

To the side of the table next to the saw are attached removable and adjustable supports or brackets 32, 32' forming extensions to the table Figs. 3 and 5. These extensions are rendered adjustable for the purpose of bringing them close to the saw in ordinary ripping and for moving them farther away when ripping at an angle. These brackets have ribs formed thereon fitting into a groove 33, in the edge of the table and are each secured to the table by a nut and bolt the head of the latter being constructed to slide in the said groove. In tilting the table from a horizontal to a vertical position, the bracket 32' which is nearest the tilting frame, is removed in order that it shall not interfere with the saw and is again replaced when the table has reached the vertical position.

The guide 34, consists of a piece of spring steel bolted to a slide 35, in the table top and is curved upwardly at the end near the saw so as to provide a place for the saw when used in resawing and has beyond the place formed by this bend, a plate which shall support the lumber when used in resawing. Said plate also serves as a portion of the guide when used in ripping. The guide is also thickened at the end farthest from the saw to furnish the proper guiding and supporting surface. The slide 35, to which the guide is connected is provided with a suitable channel and rib for co-operation with the complementary rib and channel formed on portion 36, of the table top. Slide 35, has formed upon or secured to the under side thereof a rack 37. In this rack meshes a pinion upon the end of shaft 38, to the outer end of which is secured the dial wheel and indicator 39, used in rotating the shaft to adjust the guide. Said dial wheel is secured to the shaft 38, by a friction joint formed between the internally beveled flange upon the back of the wheel and a corresponding beveled collar 40, secured to said shaft, a nut 41, being screwed upon the end of the shaft to retain the wheel and collar in engagement with each other. This dial wheel 39, has upon its face about its periphery the indicator graduated to represent inches and eighths of inches. Upon the reverse side of the wheel are formed notches corresponding with the one-eighth indications on the face. To the edge of the table is secured a knife edge or stop 42, adapted to engage in said notches. The shaft 38, has thereon a spring 43, tending to force it inward and retain the disk in engagement with the knife-edge.

On the face of the dial wheel is located a crank pin or handle 44, for furnishing a convenient means of operating the guide mechanism. To move the guide either one way or the other it is only necessary to pull outwardly on the wheel 39, and rotate it in the direction in which the guide is to be moved. The teeth of the rack and pinion are so proportioned with respect to the gradations on the dial that the rotation of the dial wheel to the distance of one eighth of an inch or any number of inches will cause the guide to move the same distance, the complete rotation of the dial wheel moving the guide a definite number of inches. If, however, the guide is set for slitting a certain width, say five inches, when in the horizontal position, and it is desired to slit a five inch strip with a beveled edge and the table is tilted to give the desired bevel, it will be found that the distance between the guide and saw is not exactly the same as before. Therefore, to make it the same, it is necessary to readjust the guide. This is done by moving the guide to the desired distance from the saw, clamping it to the table by means of the screw 45, passing through the guide and against the piece 36, of the table top, unscrewing the screw 41, and adjusting the dial wheel so that the knife blade shall enter the desired notch, then tightening up the nut 41, and loosening the screw 45. By this construction it is possible to adjust the guide accurately to any desired distance from the saw. It will be noticed that the trunnions upon which the tilting frame is mounted are in a line nearly over the middle of the table and are at such a distance therefrom or more particularly from the feed rollers as to bring the feed rollers and table within the desired proximity to the saw when the table is tilted into the vertical position. It is not necessary to mount the table by means of pivots or trunnions, but when they are used their location must be such that when the table is tilted from a horizontal into a vertical position it will be on one side of the saw and the feed rollers on the other. Not only may other means be employed for the support of the tilting table, but the pivoted centers about which it is tilted may be at other positions than the one indicated by the trunnions, it being only necessary to so locate such center that the relative location of the table and saw may be changed through an angle of ninety degrees, the gist of my invention residing in so constructing the machine that it may serve the purpose both of a rip-saw and a resaw.

In this construction to convert the machine from a slitting machine into a resawing machine it is only necessary to remove one of the brackets 32, loosen the clamp on rod 22, swing the table through an angle of ninety degrees, tighten said clamp and replace said bracket. In this change the sliding belt fastener adjusts itself and leaves the belt in proper condition for operating the feed rollers. The feed rollers and their operating mechanism being mounted directly upon the tilting frame need no re-adjustment for either kind of sawing. The saw with its operating mechanism, guides, &c., may remain the same for both positions of the table or the upper guide may be vertically adjusted as desired.

What I claim as my invention is—

1. A sawing machine provided with a tilting table so mounted in the frame of the machine that it may be tilted from a horizontal to a vertical position and present the table and feeding mechanism to the saw in proper position for resawing.

2. In a sawing machine, the combination of the saw, a tilting table, and means for changing the relative position thereof through an angle of ninety degrees to enable the machine to act as a resaw or as a rip saw.

3. In a combined ripsawing and resawing machine, the combination of a tilting frame so mounted in the frame of the machine that it may be tilted through an angle of ninety degrees, and a sawing table mounted on the tilting frame.

4. In a combined ripsawing and resawing machine, the combination of a tilting frame so mounted in the frame of the machine that it may be tilted through an angle of ninety degrees, a sawing table mounted on the tilting frame, the feed rollers and their operating gearing also mounted on said tilting frame, and means for holding the tilting frame and table at any desired angle to the saw.

5. In a combined ripsawing and resawing machine, the combination with the tilting frame mounted to swing through an angle of ninety degrees, of a table adjustable longitudinally of the frame, self-adjusting feed rollers and their operating gearing also mounted on said frame, and means for retaining said tilting frame and its table at the desired angle.

6. In a combined ripsawing and resawing machine, the combination with a tilting frame carrying the table and feed rolls, of a rod hinged to the frame of the machine, and a grip hinged to the tilting frame for engagement with said rod to hold the frame and its table at the desired angle.

7. In a combined ripsaw and resaw, the combination with the tilting table, of brackets or extensions adjustably and removably mounted upon the edge of the table to project at either side of the saw.

8. In a combined ripsaw and resaw, the combination with a tilting frame, mounted to swing through an angle of ninety degrees of a table thereon, feed rollers and their operating gear also mounted thereon, a pulley on the operating shaft of said gear, a belt running thereover and over the pulley on the driving shaft of the machine, and belt tightening pulleys mounted on a block sliding upon a way secured to the frame of the machine for the purpose set forth.

9. In a combined ripsaw and resaw, the combination with a tilting table mounted to swing through an angle of ninety degrees, of a guide operating as a guide in ripping and as a support for the lumber in resawing.

10. In a combined band ripsaw and resaw, the combination with a tilting table, of a guide operating as a guide in ripping and as a support for the lumber in resawing, and having a recess formed therein to receive the saw when acting as a support for the lumber.

11. In a sawing machine, the combination with the table, of a slide therein, mounted on ways below the surface thereof, a guide connected thereto, an operating shaft for said slide located below the table and provided with an indicator at the side thereof, and means for holding said shaft and indicator in a fixed position.

12. In a sawing machine, the combination with a tilting table mounted to tilt through an angle of ninety degrees, of a guide thereon formed to operate either as a guide or as a support for the lumber, a rotary operating shaft for said guide, an indicator upon said shaft at the side of the table, and means for adjusting the indicator about said shaft.

13. In a sawing machine, the combination with a tilting frame mounted to move through an angle of ninety degrees and a guide, of a slide in the surface of the table connected to the guide and having a rack thereon, a shaft located under the table and projecting at one side thereof, a gear at one end meshing with said rack, and an indicator at the other end provided with gradations properly spaced to correspond with the movement of the guide.

14. In a sawing machine, the combination with a tilting table mounted to move through an angle of ninety degrees and a guide, of a slide in the surface of the table connected to the guide, a rotary shaft for moving the guide mounted in bearings under the table and capable of moving endwise, a spring opposing said endwise movement, and a stop normally retaining the shaft against rotation.

15. In a sawing machine, the combination with a tilting table and a guide mounted on a slide in the surface of the table, of a rotary operating shaft for the guide located under the table and projecting at one side thereof, an indicator dial mounted upon the shaft at the side of the table and secured thereto by an adjusting friction joint, and a stop for holding said dial in an adjusted position.

16. In a sawing machine, the combination with the table mounted to tilt from a horizontal to a vertical position, of a guide secured to a slide in the surface of the table, a rotary operating shaft for the guide located under the table and projecting at the side thereof, a dial wheel on the projecting end of said shaft provided with a scale on its face and with notches on its back corresponding with the gradation of the scale, and a stop on the table for entering said notches.

17. In a sawing machine, the combination with a tilting table mounted to swing through an angle of ninety degrees, of a guide, a set screw for holding the guide in a fixed position when desired, a rotary operating shaft for the guide located below the surface of the table, a dial wheel thereon provided with notches corresponding with the gradations of the dial, a stop on the table for entering said notches, and a frictional joint between the dial wheel and the operating shaft.

18. In a combined rip-sawing and resawing machine, a tilting frame carrying the table or bed plate and provided with arms projecting over said table which terminate in trunnions located approximately at equal distances from the saw and the normal plane of the table, in combination with bearings on the frame of the machine constructed to receive said trunnions, thereby providing for swinging the table from a horizontal to a vertical position and presenting it properly to the saw for resawing.

Signed at Saginaw, in the county of Saginaw and State of Michigan, this 6th day of March, A. D. 1894.

EDWARD C. MERSHON.

Witnessess:
  F. J. POOLE,
  R. L. JONES.